US010015717B1

(12) United States Patent
Oroskar et al.

(10) Patent No.: US 10,015,717 B1
(45) Date of Patent: Jul. 3, 2018

(54) CELL RESELECTION PRIORITY BASED ON PROPERTIES OF COMMUNICATION BANDS

(71) Applicant: Sprint Spectrum LP, Overland Park, KS (US)

(72) Inventors: Siddharth Oroskar, Overland Park, KS (US); Jasinder Singh, Olathe, KS (US); Dhiraj Satish-Kumar, Ashburn, VA (US)

(73) Assignee: Sprint Spectrum LP, Overland Park, KS (US)

(*) Notice: Subject to any disclaimer, the term of this patent is extended or adjusted under 35 U.S.C. 154(b) by 0 days.

(21) Appl. No.: 15/793,150

(22) Filed: Oct. 25, 2017

(51) Int. Cl.
| | |
|---|---|
| *H04W 36/00* | (2009.01) |
| *H04W 36/30* | (2009.01) |
| *H04W 72/06* | (2009.01) |
| *H04W 36/04* | (2009.01) |
| *H04W 48/20* | (2009.01) |
| *H04W 72/12* | (2009.01) |
| *H04W 72/04* | (2009.01) |

(52) U.S. Cl.
CPC .......... *H04W 36/30* (2013.01); *H04W 36/04* (2013.01); *H04W 48/20* (2013.01); *H04W 72/06* (2013.01); *H04W 72/1242* (2013.01); *H04W 72/0453* (2013.01)

(58) Field of Classification Search
CPC ..... H04W 8/005; H04W 24/00; H04W 56/00; H04W 88/02; H04W 24/08; H04W 72/04; H04W 72/0406; H04W 72/042; H04W 72/085; H04L 5/0023; H04L 1/0009; H04L 1/0025; H04L 1/0026; H04L 5/0037; H04L 5/023; H04L 27/2608

USPC ......... 455/436, 454, 501; 370/280, 252, 331
See application file for complete search history.

(56) References Cited

U.S. PATENT DOCUMENTS

| | | | | |
|---|---|---|---|---|
| 9,030,974 | B2* | 5/2015 | Yang | H04W 72/042 370/280 |
| 9,184,886 | B2* | 11/2015 | Bontu | H04L 5/001 |
| 2005/0075125 | A1* | 4/2005 | Bada | H04W 48/20 455/525 |
| 2011/0013581 | A1* | 1/2011 | Lee, II | H04L 5/0007 370/329 |
| 2011/0103292 | A1* | 5/2011 | Pasad | H04B 7/155 370/315 |
| 2011/0103295 | A1* | 5/2011 | Khandekar | H04W 72/04 370/315 |
| 2011/0194644 | A1* | 8/2011 | Liu | H04L 5/0023 375/295 |

(Continued)

*Primary Examiner* — Mahendra Patel (57) ABSTRACT

Systems, methods, and processing nodes are related to improving service in a wireless network. The method includes determining a frame configuration and bandwidth for a plurality of communication bands available for communication with a wireless device. The method includes generating a reselection priority based on one or more of the frame configuration and bandwidth for each of the plurality of communication bands. The reselection priority of each of the plurality of communication bands is based on a suitability of one or more of the frame configuration and bandwidth to service uplink traffic. The method includes transmitting the reselection priority to the wireless device. The wireless device utilizes the reselection priority in communication band reselection based on uplink traffic generated by the wireless device.

15 Claims, 7 Drawing Sheets

(56) References Cited

U.S. PATENT DOCUMENTS

| | | | |
|---|---|---|---|
| 2011/0200143 A1* | 8/2011 | Koo | H04B 7/0697 375/299 |
| 2011/0216675 A1 | 9/2011 | Li et al. | |
| 2011/0222420 A1* | 9/2011 | Li | H04L 1/0003 370/252 |
| 2012/0147794 A1* | 6/2012 | Chung | H04L 5/0057 370/280 |
| 2014/0119237 A1 | 5/2014 | Gan et al. | |
| 2014/0198680 A1* | 7/2014 | Siomina | H04L 5/14 370/252 |
| 2014/0378140 A1* | 12/2014 | Gopal | H04W 76/048 455/437 |
| 2016/0095107 A1* | 3/2016 | Negus | H04B 7/0691 370/280 |
| 2016/0234746 A1* | 8/2016 | Gopal | H04W 36/26 |
| 2017/0188391 A1* | 6/2017 | Rajagopal | H04W 74/0816 |
| 2017/0295553 A1* | 10/2017 | Lee | H04W 56/001 |
| 2018/0034604 A1* | 2/2018 | Rico Alvarino | H04L 5/0037 |

\* cited by examiner

CELL RESELECTION PRIORITY BASED ON PROPERTIES OF COMMUNICATION BANDS

TECHNICAL BACKGROUND

As wireless networks evolve and grow, there are ongoing challenges in providing high-quality service to increasing numbers of wireless devices or user equipment (UE) in various coverage areas of a wireless network. For instance, a heterogeneous network may include various types of access nodes such as a higher power access node (macro cells) as well as one or more smaller, lower power network access nodes (small cells), such as microcells, femtocells, picocells, Home evolved Node Bs (HeNBs), and Enterprise evolved Node Bs (EeNBs). Further, each access node in the wireless network may provide or "deploy" one or more air-interface frequency bands for serving wireless devices on the network. For example, a particular small cell access node may deploy a different air-interface frequency band than is being used by the macro cell, a macro cell may deploy three different frequency bands, a neighboring macro cell with an overlapping range may serve two of the three frequency bands, etc. The plurality of frequency bands served in the same area enable UEs such as wireless devices to select specific frequency bands depending upon congestion, usage, application type, etc. However, current methods for reselection of frequency bands are inefficient, particularly when wireless devices are in idle mode and resume activity from idle mode.

OVERVIEW

Exemplary embodiments described herein include systems, methods, and processing nodes for improving service in a wireless network. An exemplary method for improving service in a wireless network includes determining a frame configuration and bandwidth for a plurality of communication bands available for communication with a wireless device. The method further includes generating a reselection priority based on one or more of the frame configuration and bandwidth for each of the plurality of communication bands. The reselection priority of each of the plurality of communication bands is based on a suitability of one or more of the frame configuration and bandwidth to service uplink traffic. The method includes transmitting the reselection priority to the wireless device. The wireless device utilizes the reselection priority in communication band reselection based on uplink traffic generated by the wireless device.

An exemplary system for improving service in a wireless network includes a processing node and a processor coupled to the processing node. The processor configures the processing node to determine properties of a plurality of communication bands available for communication with a wireless device. The processor further configures the processing node to compare, based on one or more of the properties, a suitability of each of the plurality of communication bands to service uplink traffic from the wireless device. The processor further configures the processing node to generate a reselection priority based on the comparison. Also, the processor configures the processing node to transmit the reselection priority to the wireless device. The wireless device utilizes the reselection priority in communication band reselection based on uplink traffic generated by the wireless device.

An exemplary processing node for improving service in a wireless network is configured to perform operations including receiving a reselection priority for a plurality of communication bands. The reselection priority of each of the plurality of communication bands is based on a suitability of each of the plurality of communication bands to service uplink traffic. The operations further include determining uplink traffic over a predetermined period of time. Also, the operation include, in response to the uplink traffic exceeding a predetermined threshold over the predetermined period of time, utilizing the reselection priority in communication band reselection.

DETAILED DESCRIPTION

Generally, wireless devices or user equipment may be required to select certain communication bands (e.g., frequency bands) upon resuming from idle (or select a different communication bands during idle). This sometimes may result in selecting a band that is not ideal for the wireless device due to the static nature of priority reselection. In embodiments of the present disclosure, a wireless network can be designed to generate a reselection priority based on the properties of the communication bands and the activity of the wireless devices. In embodiments, a reselection priority can be generated that considers and addresses the uplink traffic of wireless devices. In embodiments, the different communication bands can be prioritized such that communication bands that are more suitable for uplink traffic can be prioritized higher.

When the reselection priority is provided to a wireless device, the wireless device can monitor uplink traffic. When the uplink traffic is at a level to be considered, the wireless device can utilize the reselection priority that accounts for the suitability of the communication bands to accommodate uplink traffic.

By considering both the properties of the communication bands and the activity of wireless devices, embodiments of the present disclose can provide improved communication to wireless devices. For example, by considering uplink traffic, embodiments of the present disclose can dynamically facilitate reselection that avoids inefficient reselection of communication bands based on static priority. These and additional operations are further described with respect to the embodiments depicted in FIGS. 1, 2A-2C, and 3-6 below.

Figure 1:
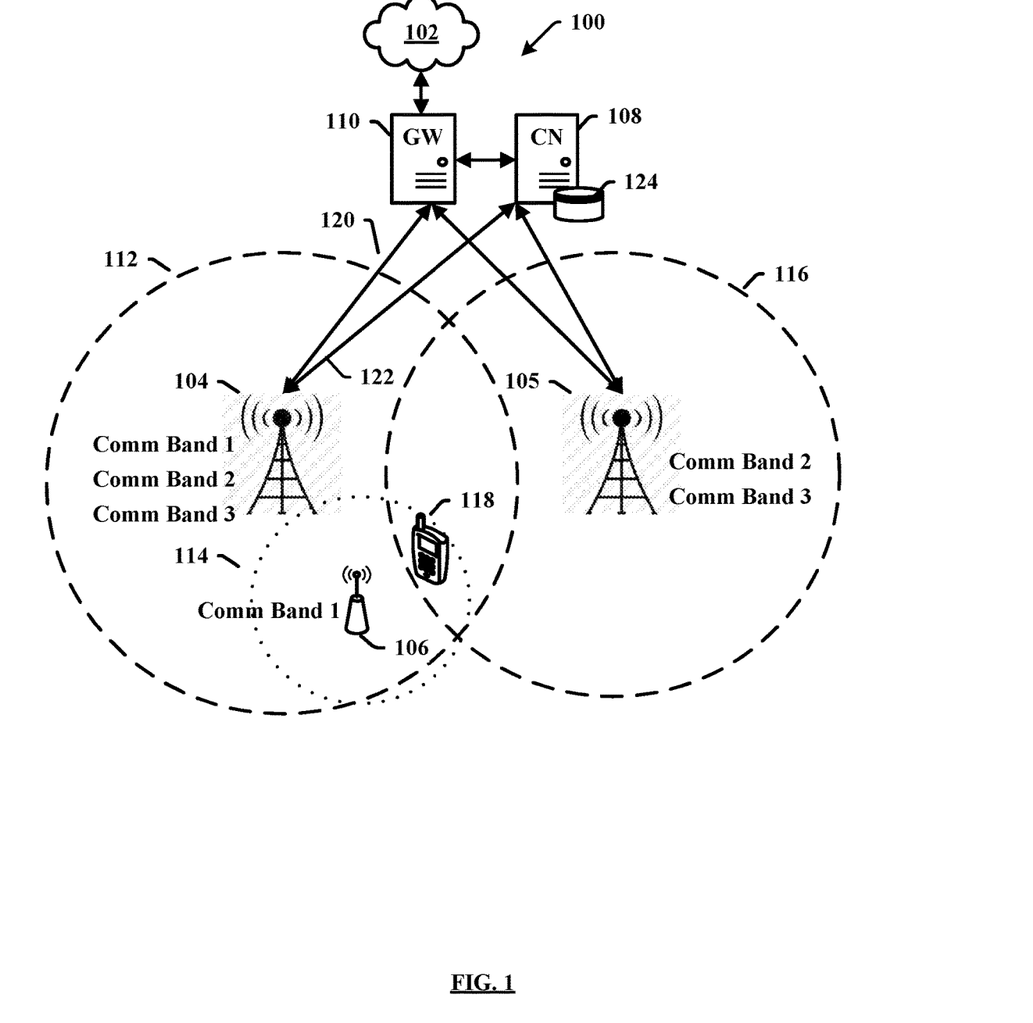
FIG. 1 depicts an exemplary system for a system for communication band reselection in a wireless network, according to embodiments of the present disclosure.

FIG. 1 depicts an example of a communication system 100 for minimizing bottlenecks in a wireless network. While FIG. 1 illustrates various components contained in the communication system 100, FIG. 1 illustrates one example of a communications system and additional components can be added and existing components can be removed.

As illustrated in FIG. 1, the communication system 100 includes a communication network 102, a first access node 104, a second access node 105, a relay node 106, a controller node 108, and a gateway node 110. Other network elements can be present in the communication system 100 to facilitate communication but are omitted for clarity, such as base stations, base station controllers, mobile switching centers, dispatch application processors, and location registers such as a home location register or visitor location register. Furthermore, other network elements can be present to facilitate communication between the access node 104 and the communication network 102 which are omitted for clarity, including additional processing nodes, routers, gateways, and physical and/or wireless data links for carrying data among the various network elements.

The access node 104 is illustrated as having a coverage area 112, with the relay node 106 being located within the coverage area 112 and accessing network services directly from the access node 104 via an air interface deployed by the access node 104. The relay node 106 can be deployed with in the coverage area 112 to provide an increased coverage area 114. In other words, relay node 106 can act as a wireless access point for wireless devices and communicates with access node 104 via the air interface, hereinafter referred to as a relay backhaul air interface, or simply "backhaul," and the access node 104 may be referred to as a donor access node. The access node 105 is illustrated as having a coverage area 116.

The access nodes 104, 105, and the relay node 106 may each deploy one or more communication bands: communication bands 1, 2, and 3. The communication bands 1, 2, and 3 can include different frequencies, for example, 800 MHz (band 26, or B26), 1.9 GHz (band 25, or B25), and 2.5 GHz (band 41, or B41). For instance, bands 25 and 26 may use Frequency Division Duplex Long Term Evolution (FDD-LTE), and band 41 may use Time Division Duplex Long Term Evolution (TDD-LTE). Other combinations of access nodes and frequency bands are possible, and are be within the purview of those having ordinary skill in the art at the time of this disclosure. In embodiments, the access nodes 104, 105, and the relay node 106 can serve wireless devices such as a wireless device 118 using one of the communication bands available, e.g., frequency bands B26, B25, or B41.

As the wireless device 118 remains in the coverage areas 112, 114, and 116, the wireless device 118 can enter an IDLE mode. For example, IDLE mode can include processes by the wireless device 118 to find and maintain service in the communication system 100. The process can include processes in which the wireless devices changes communication bands. The wireless device 118 can change frequency bands in order to utilize the best communication conditions among the communication bands. In embodiments, a reselection priority can be determined for the wireless device 118 that prioritizes the communication bands 1, 2, and 3 based on a suitability of the communication bands 1, 2, and 3, servicing uplink traffic from the wireless device 118. In embodiments, a component of the communication system (e.g., access node 104, access node 105, relay node 106, etc.) can determine the properties of the communication bands 1, 2, 3 (e.g. band type, frame configuration, bandwidth, etc.) The properties can be compared to determine which of the communication bands is more suitable to service uplink traffic from the wireless device 118. Based on the comparison, the communication bands 1, 2, and 3 can be prioritized such that communication bands that are more suitable for uplink traffic are prioritized higher. When the reselection priority is provided to the wireless device 118, the wireless device 118 can monitor uplink traffic and utilize the reselection priority or a default priority based on the amount of the uplink traffic. When the uplink traffic is at a level to be considered, the wireless device 118 can utilize the reselection priority that accounts for the suitability of the communication bands to accommodate uplink traffic.

The communication network 102 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). The communication network 102 can be capable of carrying data, for example, to support voice, push-to-talk, broadcast video, and data communications by the wireless device 118, 106, etc. Wireless network protocols can include multimedia broadcast multicast service (MBMS), code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that can be utilized by the communication network 102 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). The communication network 102 can also include additional base stations, controller nodes, telephony switches, internet routers, network gateways, computer systems, communication links, or some other type of communication equipment, and combinations thereof.

The access node 104 and the access node 105 can be any network node configured to provide communication between the wireless device 118, the relay node 106, and the communication network 102, including standard access nodes and/or short range, low power, small access nodes. For instance, the access node 104 and the access node 105 can include any standard access node, such as a macrocell access node, base transceiver station, a radio base station, an eNodeB device, an enhanced eNodeB device, or the like. In other embodiments, the access node 104 and the access node 105 can be a small access node including a microcell access node, a picocell access node, a femtocell access node, or the like such as a home NodeB or a home eNodeB device.

The access node 104 and the access node 105 can include a plurality of antennae and transceivers for enabling communication using various operating modes and different frequency bands or carriers and establishing communication links, e.g., air interfaces, with the wireless device 118, the relay node 106, and the like. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE),—including combinations, improvements, or variations thereof. Moreover, it is noted that while the access node 104 and the access node 105 are illustrated in FIG. 1, any number of access nodes and relay nodes can be implemented within the system 100. For example, the relay node 106 can be communicating with a different access node in the communication system 100. Likewise, for example, additional relay nodes can be communicating with the access node 104 or access node 105.

The access node 104 and the access node 105 can include a processor and associated circuitry to execute or direct the execution of computer-readable instructions to perform operations such as those further described herein. Briefly, the access node 104 and the access node 105 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. Further, the access node 104 and the access node 105 can receive instructions and other input at a user interface. The access node 104 and the access node 105 communicates with the gateway node 110 and controller node 108 via communication links 120, 122. The access node 104 and the access node 105 can communicate with other access nodes (not shown) using a direct link such as an X2 link or similar link.

The relay node 106 can be small access nodes including a microcell access node, a picocell access node, a femtocell access node, or the like such as a home NodeB or a home eNodeB device. The relay node 106 can include a plurality of antennae and transceivers for enabling communication using various operating modes and different frequency bands or carriers and establishing communication links with the wireless device 118, the access node 104, the access node 105, and the like. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), or WiFi,—including combinations, improvements, or variations thereof. Moreover, it is noted that while the relay node 106 is illustrated in FIG. 1, any number of relay nodes can be implemented within the system 100.

The relay node 106 can include a processor and associated circuitry to execute or direct the execution of computer-readable instructions to perform operations such as those further described herein. Briefly, the relay node 106 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. Further, the relay node 106 can receive instructions and other input at a user interface.

The wireless device 118 can be any device, system, combination of devices, or other such communication platform capable of communicating wirelessly with access nodes, such as the access node 104, access node 105, relay node 106, and the like, using one or more frequency bands deployed therefrom. The wireless device 118 can be, for example, a mobile phone, a wireless phone, a wireless modem, user equipment (UE), a personal digital assistant (PDA), a voice over internet protocol (VoIP) phone, a voice over packet (VOP) phone, or a soft phone, as well as other types of devices or systems that can exchange audio or data via the access node 104, the access node 105, and the relay node 106. Other types of communication platforms are possible.

The controller node 108 can be any network node configured to communicate information and/or control information over the communication system 100. The controller node 108 can be configured to transmit control information associated with a handover procedure. The controller node 108 can be a standalone computing device, computing system, or network component, and can be accessible, for example, by a wired or wireless connection, or through an indirect connection such as through a computer network or communication network. For example, the controller node 108 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art will recognize that the controller node 108 is not limited to any specific technology architecture, such as LTE and can be used with any network architecture and/or protocol.

The controller node 108 can include a processor and associated circuitry to execute or direct the execution of computer-readable instructions to obtain information. The controller node 108 can retrieve and execute software from storage, which can include a disk drive, a flash drive, memory circuitry, or some other memory device, and which can be local or remotely accessible. In an example, the controller node 108 includes a database 124 for storing reselection priority, as discussed herein. This information can be requested by or shared with the access node 104, the access node 105, the relay node 106, via air communication links, wired communication links, X2 connections, and so on. The software can include computer programs, firmware, or some other form of machine-readable instructions, and can include an operating system, utilities, drivers, network interfaces, applications, or some other type of software, and combinations thereof. The controller node 108 can receive instructions and other input at a user interface.

The gateway node 110 can be any network node configured to interface with other network nodes using various protocols. The gateway node 110 can communicate user data over the communication system 100. The gateway node 110 can be a standalone computing device, computing system, or network component, and can be accessible, for example, by a wired or wireless connection, or through an indirect connection such as through a computer network or communication network. For example, the gateway node 110 can include a serving gateway (SGW) and/or a public data network gateway (PGW), etc. One of ordinary skill in the art will recognize that the gateway node 110 is not limited to any specific technology architecture, such as LTE and can be used with any network architecture and/or protocol.

The gateway node 110 can include a processor and associated circuitry to execute or direct the execution of computer-readable instructions to obtain information. The gateway node 110 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. The gateway node 110 can receive instructions and other input at a user interface.

The communication links 120, 122 can use various communication media, such as air, space, metal, optical fiber, or some other signal propagation path—including combinations, improvements, or variations thereof. The communication links 120, 122 can be wired or wireless and use various communication protocols such as Internet, Internet protocol (IP), local-area network (LAN), optical networking, hybrid fiber coax (HFC), telephony, Ti, or some other communication format—including combinations, improvements, or variations thereof. Wireless communication links can be a radio frequency, microwave, infrared, or other similar signal, and can use a suitable communication protocol, for example, GSM, CDMA, WiMAX, or LTE,—including combinations, improvements, or variations thereof. The communication links 120, 122 can include S1 communications links. Other wireless protocols can also be used. The communication links 120, 122 can be a direct link or might include various equipment, intermediate components, systems, and networks. The communication links 120, 122 can include many different signals sharing the same link.

In the embodiments and examples described above and below, the access node 104, the access node 105, or the relay node 106 are described as performing the operations of mitigating interference. In any of the embodiments and examples, however, other elements of the communication network 100 can perform any portion of the process described above.

Other network elements can be present in the communication system 100 to facilitate communication but are omitted for clarity, such as base stations, base station controllers, mobile switching centers, dispatch application processors, and location registers such as a home location register or visitor location register. Furthermore, other network elements that are omitted for clarity can be present to facilitate communication, such as additional processing nodes, routers, gateways, and physical and/or wireless data links for carrying data among the various network elements, e.g. between the access node 104 and the communication network 102.

Figure 2A:
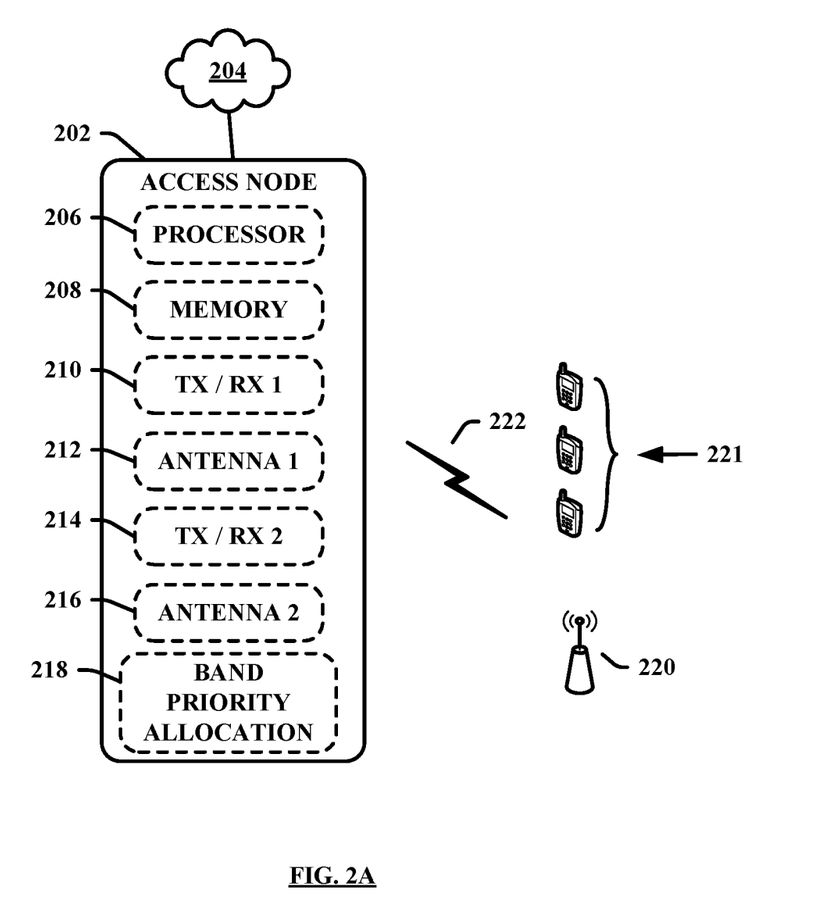
FIG. 2A depicts an example of an access node in a system for minimizing bandwidth bottlenecks in a wireless network, according to embodiments of the present disclosure.

FIG. 2A depicts components of an example of an access node 202 coupled to and communicating with a communication network 204. For example, the access node 202 and communication network 204 can be an example of the access node 104 or the access node 105 and communication network 102, as illustrated in FIG. 1. In this example, the access node 202 includes a processor 206, a memory 208, a first transceiver 210, a first antenna 212, a second transceiver 214, and a second antenna 216. The access node 202 can also include a band priority unit 218 for performing the processes described herein.

As illustrated, the first transceiver 210, first antenna 212, second transceiver 214, and second antenna 216 can provide communication signals to provide an air link with a relay node 220 or wireless device 221. For example, the relay node 220 can be an example of the relay node 106, as illustrated in FIG. 1. Likewise, for example, the wireless devices 221 can be examples of the wireless device 118, as illustrated in FIG. 1. The antenna 212 (and/or the antenna 216) can be used to deploy a signal 222 to communicate with the relay node 220. It should be understood that each antenna 214, 216 can comprise a plurality of antennae or antennae arranged in one or more arrays.

In embodiments, the band priority unit 218 can configured to determine reselection priority, as described herein. In embodiments, the band priority unit 218 can be implemented as hardware, software, or combinations thereof. In one example, the band priority unit 218 can be implemented as a software program or module that includes logical instructions for performing the process described herein. In this example, a copy of the bandwidth band priority unit 218 can be stored in memory 208 and the logical instructions of the band priority unit 218 can be executed by processor 206.

In another example, the band priority unit 218 can be implemented as a hardware unit contain within or coupled to the access node 202. In this example, the band priority unit 218 can include one or more processors and associated circuitry to execute or direct the execution of computer-readable instructions to perform operations and processes as described herein. The band priority unit 218 can retrieve and execute software, which includes logical instructions for performing the process described herein, from storage. The storage can include a disk drive, a flash drive, memory circuitry, or some other memory device, and which can be local or remotely accessible. The software can comprise computer programs, firmware, or some other form of machine-readable instructions, and can include an operating system, utilities, drivers, network interfaces, applications, or some other type of software, including combinations thereof.

While FIG. 2A illustrates the band priority unit 218 being a part of the access node 202, the band priority unit 218 can be a part of another device or system communicating with the access node 202. Likewise, the band priority unit 218 can be a stand-alone system or device that communicates with the access node 202.

Figure 2B:
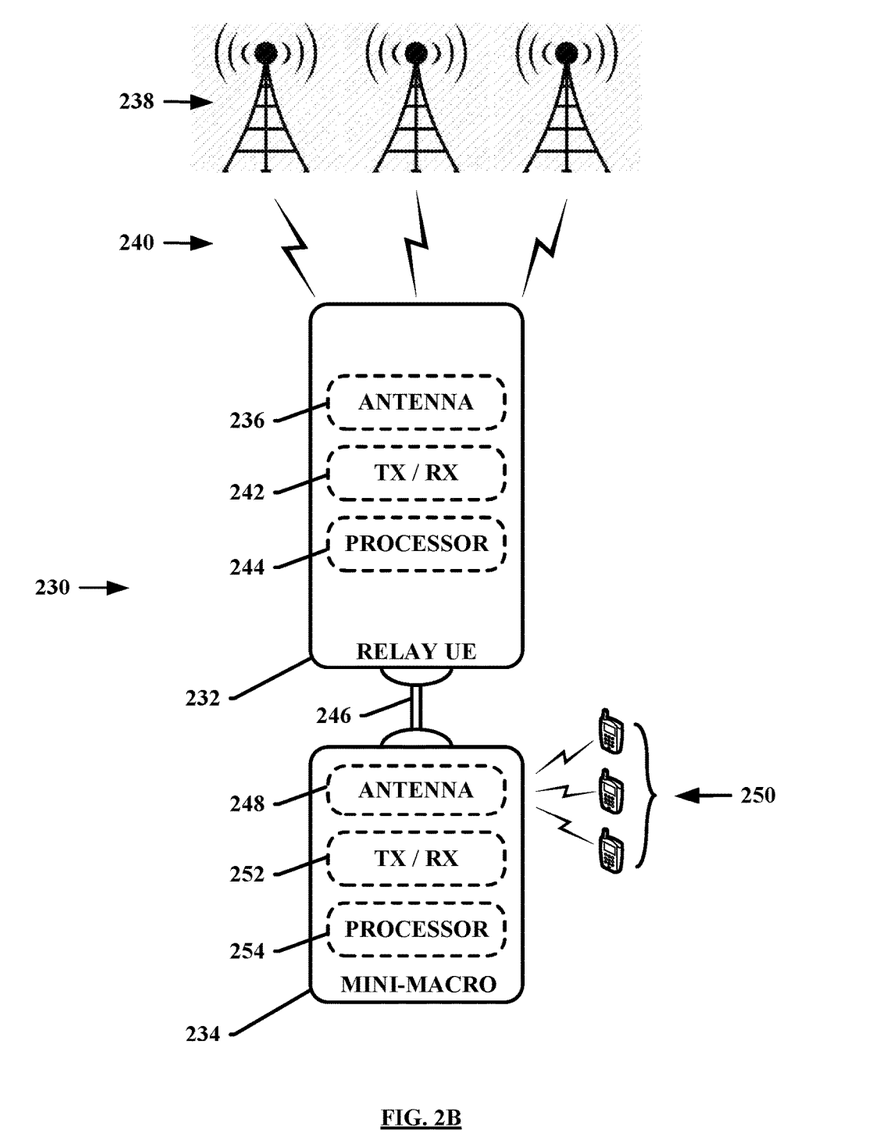
FIGS. 2B and 2C depict examples of relay nodes in a system for minimizing bandwidth bottlenecks in a wireless network, according to embodiments of the present disclosure.

FIG. 2B depicts an example of a small relay node 230, which includes a relay wireless device 232 coupled to a mini-macro access node 234. The relay wireless device 232 can include an antenna 236 for direct (i.e., unrelayed) communication with one or more of access nodes 238 (or relayed communications with a relay node) via communication links 240, a transceiver 242, and a processor 244. For example, the small relay node 230 can be an example of relay node 106, as illustrated in FIG. 1. Further, the relay wireless device 232 is coupled to the mini-macro access node 234 via a communication interface 246. The communication interface 246 can be any interface that enables direct communication between the relay wireless device 232 and the mini-macro access node 234, such as USB, FireWire, or any other serial, parallel, analog, or digital interface. The mini-macro access node 234 can include an antenna 248 for wireless communication with one or more wireless devices 250 (such as wireless device 118 illustrated in FIG. 1), a transceiver 252, and a processor 254. Although only one transceiver is depicted in each of the relay wireless device 232 and the mini-macro access node 234, additional transceivers can be incorporated in order to facilitate communication across the communication interface 246 and other network elements.

Figure 2C:
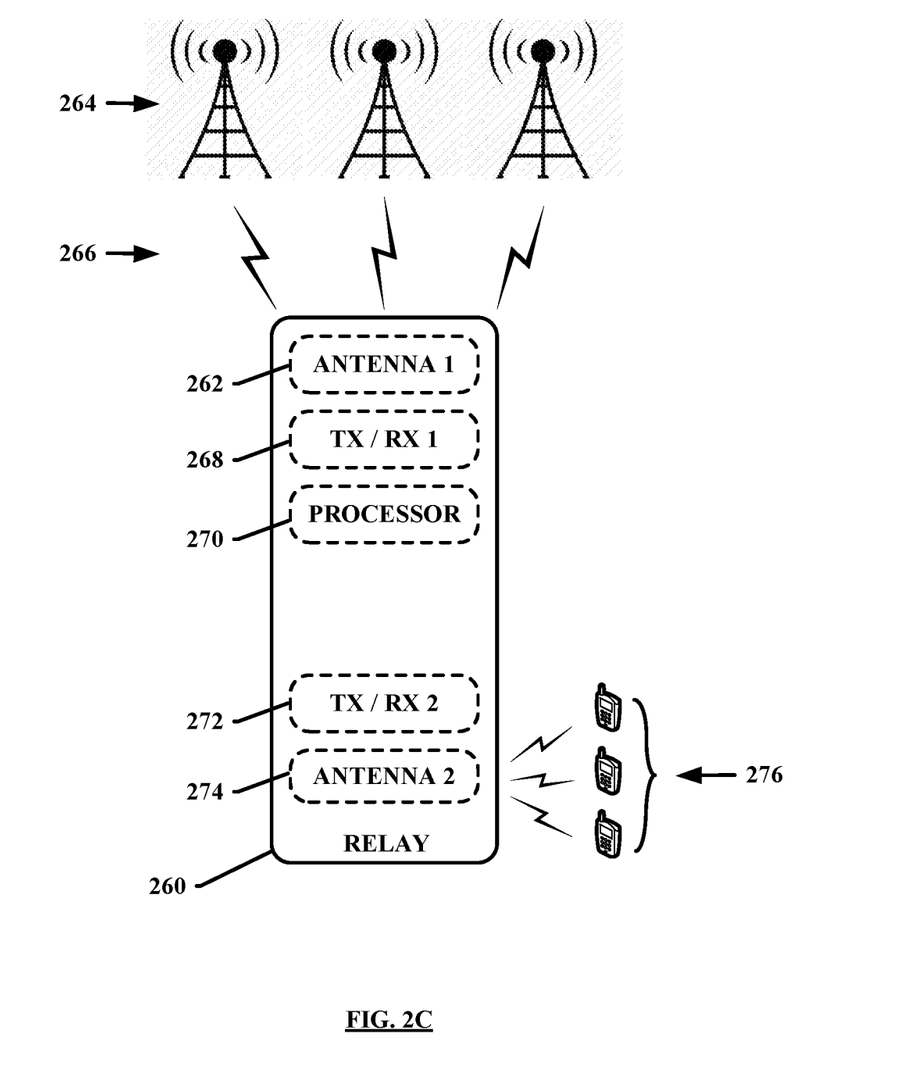

FIG. 2C depicts an example of a relay node 260. The relay node 260 includes a first antenna 262 for direct communication with one or more of access nodes 264 via a communication links 266, a first transceiver 268, and a processor 270. For example, the relay node 260 can be an example of the relay node 106, as illustrated in FIG. 1. The relay node 260 also includes a second transceiver 272 and a second antenna 274 for wireless communication with one or more wireless devices 276, for example, the wireless device 118, as illustrated in FIG. 1. Although only two transceivers are depicted in the relay node 260, additional transceivers can be incorporated in order to facilitate communication with other network elements.

Figure 3:
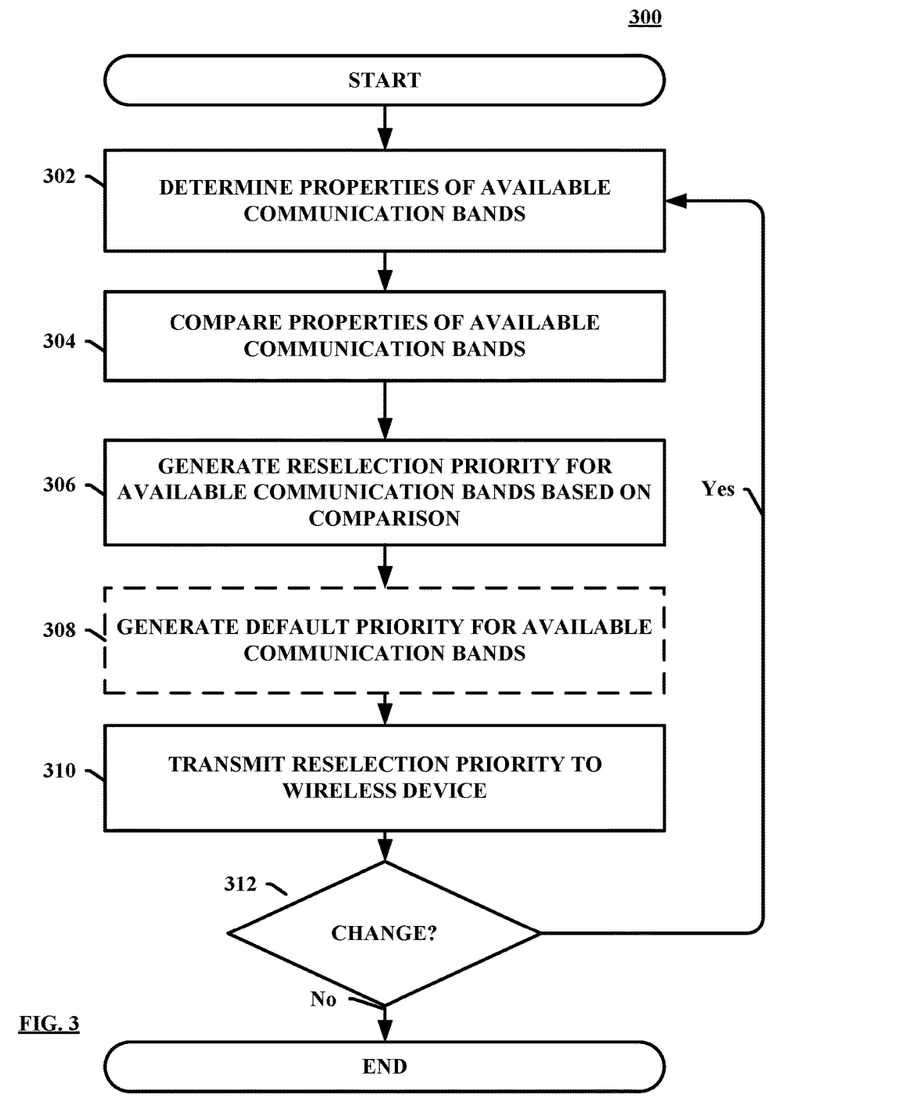
FIG. 3 depicts an example of a method for determining priority for communication band reselection, according to embodiments of the present disclosure.

FIG. 3 depicts an example of a method 300 for determining priority for communication band reselection. The method 300 of FIG. 3 can be implemented in any network node such as the access node 104, access node 105, and the relay node 106, as illustrated in FIG. 1. In other embodiments, the method 300 can be implemented with any suitable network element, for example, any network element illustrated in FIG. 1 or FIGS. 2A-2C. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the process begins, in 302, the properties of available communication bands are determined. For example, the properties of available communication bands can include the properties of any communication bands that may be accessed by a wireless device, for instance, any communication band within range (or potentially within range) of a wireless device. In embodiments, the properties of the available communication bands can include type of communication band (time division, frequency division, etc.), frame configuration of a communication band, bandwidth of a communication band, etc.

In embodiment, the properties of the available communication band can be determined by querying access node or relay nodes providing communication bands to a wireless device. For example, referring to FIG. 1, if the access node 104 is determining the properties of communication bands for the wireless device 118, the access node can determine the properties of the communication bands provided by the access node 104 and can querying the access node 105 and the relay node 106 to determine the properties of the communication bands provided by the access node 105 and the relay node 106. Likewise, in this example, the access node 104 can query other components of the communication system 100 to determine the properties of the communication bands, for instance, controller node 108, gateway node 110, etc.

After determining the properties, in 304, the properties of the communication bands can be compared. In embodiments, the properties can be compared to determine a suitability of each communication band to accommodate uplink traffic. For example, referring to FIG. 1, if communication band 1 is B 41, TDD, frame configuration (FC) 2, communication band 2 is B 25 FDD, 5 Mhz, and communication band 3 is B26, FDD, 5 MHz, the frame configuration and bandwidth of the communication bands 1, 2, and 3 can be compared to determine which communication band is more capable of handling uplink traffic relative to the other bands.

In 306, reselection priority can be generated for the available communication bands based on the comparison. In embodiments, when the suitability of each communication band to accommodate uplink traffic is compared, a communication band with a higher suitability to service uplink traffic is prioritized higher than a communication band with a lower suitability to service uplink traffic.

For example, referring to FIG. 1, based on the comparison, it can be determined that communication band 1 (B41, TDD, FC2) is more suitable for uplink communication than communication band 2 (B25, FDD, 5 Mhz) and communication band 3 (B26, FDD, 5 Mhz), and communication band 1 is prioritized higher than communication band 2 and communication band 3. Likewise, based on the comparison, it can be determined that communication band 2 is more suitable for uplink communication than communication band 3, and thus communication band 2 is prioritized higher than communication band 3. Table 1 illustrates an example of this prioritization, where a higher number indicates a higher priority.

TABLE 1

| Communication Band | Priority |
|---|---|
| 1 - (B41, TDD, FC2) | 7 |
| 2 - (B25, FDD, 5 Mhz) | 6 |
| 3 - (B26, FDD, 5 Mhz) | 5 |

While Table 1 illustrates one example of reselection priorities, the processes can be applied to any example of the communication bands 1, 2, and 3. Tables 2 and 3 below illustrate additional examples of priorities based on the properties different communication bands.

TABLE 2

| Communication Band | Priority |
|---|---|
| 1 - (B41, TDD, FC1) | 7 |
| 2 - (B25, FDD, 10 Mhz) | 7 |
| 3 - (B26, FDD) | 5 |

TABLE 3

| Communication Band | Priority |
|---|---|
| 1 - (B41, TDD, FC2) | 6 |
| 2 - (B25, FDD, 10 Mhz) | 7 |
| 3 - (B26, FDD, 5 Mhz) | 5 |

As noted in Table 2, the frame configuration of communication band 1 and the bandwidth of communication band 2 cause communication band 1 and communication band 2 to be equally prioritized. Also, as noted in Table 3, the bandwidth of communication band 2 relative to the frame configuration of communication band 1 causes communication band 2 to be prioritized higher. As seen from these examples, the relative properties of the communication bands (frame configuration, bandwidth, etc.) in handling upload traffic, guides the prioritization of the communication band in reselection.

In 308, a default priority can be optionally generated for the available communication bands. The default priority can govern the reselection process when uplink traffic does not affect the selection of a communication band. For example, the reselection priority generated in 306 can be utilized by a wireless device when the uplink traffic reaches a certain threshold. Otherwise, the default priority can be utilized by the wireless device.

For example, the default priority can be based on a reselection priority standard, such as System Information Block (SIB) Standard 4, 5, 6, and 7 for LTE, Radio Resource Connection (RRC) Release, and the like. Table 4 illustrates an example of default priority for reselection processes.

TABLE 4

| Communication Band | Priority |
|---|---|
| 1 - (B41, TDD, FC1) | 7 |
| 2 - (B25, FDD, 5 Mhz) | 6 |
| 3 - (B26, FDD) | 5 |

As noted by comparing Table 4 to Tables 1-3, the reselection priority differs from the default priority based on the properties of the communication band (band type, frame configuration, bandwidth, etc.)

In some embodiments, a component of the communication system (e.g., the access node 104, the access node 105, the relay node 106, etc.) can generate the default priority and transmit the default priority to the wireless device 118. In some embodiments, the default priority can be configured in the wireless device 118.

In 310, the reselection priority can be transmitted to a wireless device. In embodiments, the reselection priority can be transmitted using a control chancel such as SIB. For example, a component of the communication system (e.g., the access node 104, the access node 105, the relay node 106, etc.) can transmit the reselection priority to the wireless device 118.

In 312, it can be determined whether reselection priority needs to be changed. In embodiments, the state of the communication system and the wireless device can be monitored and the reselection priority can be altered based on a change. For example, the access node 104, the access node 105, the relay node 106, etc. may change available communication bands or configurations. In another example, the wireless device may travel out of the coverage area of any of the access node 104, the access node 105, or the relay node 106. In these examples, a new reselection priority can be generated based on the change in properties of the communication bands, new communication bands, etc.

At any point, the method 300 can end or return to any point.

Figure 4:
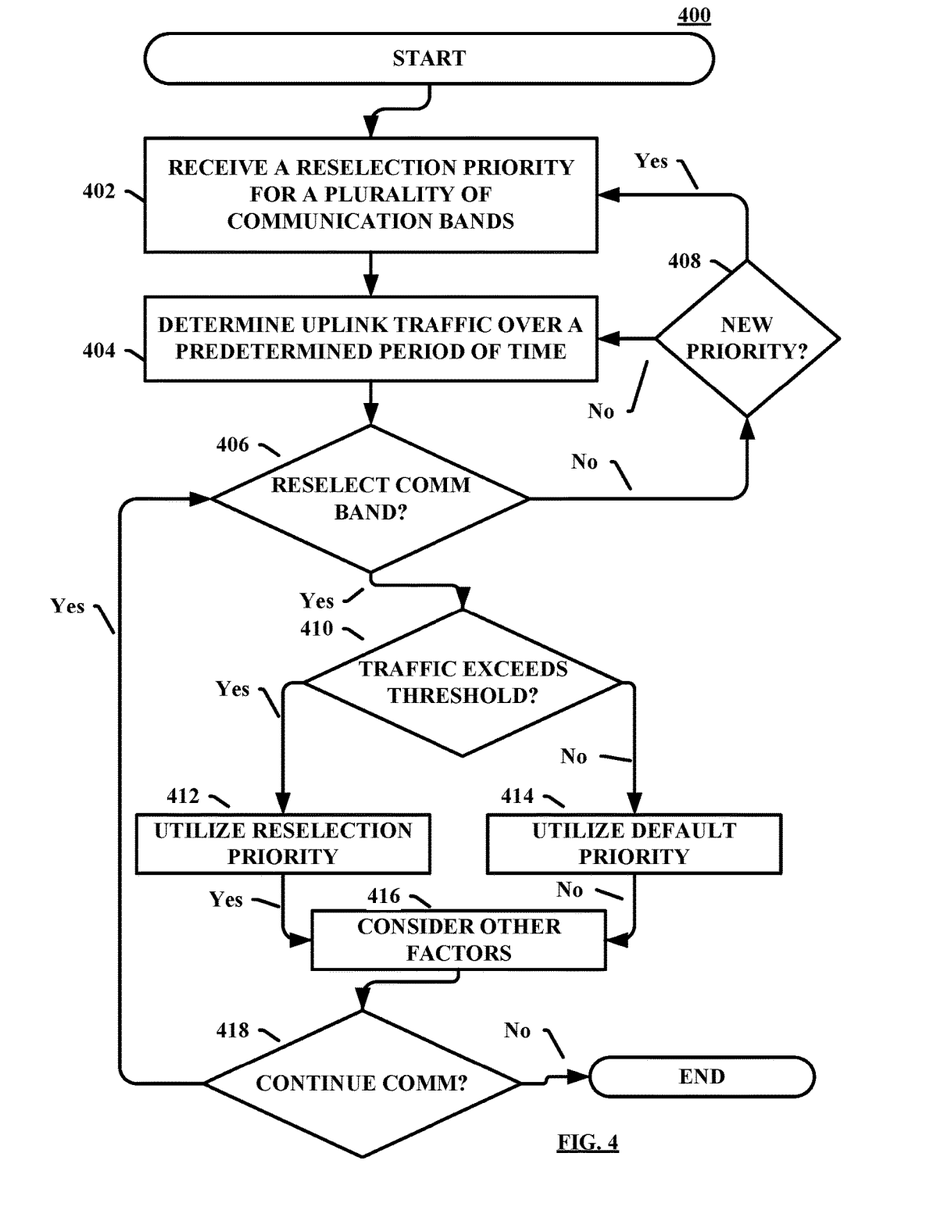
FIG. 4 depicts an example of a method for communication band reselection, according to embodiments of the present disclosure.

FIG. 4 depicts an example of a method 400 for reselection of communication bands. The method 400 of FIG. 4 can be implemented in any network node such as the access node 104, the access node 105, the relay node 106, and the wireless device 118, as illustrated in FIG. 1. In other embodiments, the method 400 can be implemented with any suitable network element, for example, any network element illustrated in FIG. 1 or FIGS. 2A-2C. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the method begins, in 402, a reselection priority can be received for a plurality of communication bands. In embodiments, the reselection priority can be received from a component of the communication system. For example, the reselection priority can be received from any one of the access node 104, the access node 105, the relay node 106, or any component.

In 404, uplink traffic over a predetermined period of time can be determined. In embodiments, the amount of data communicated as uplink traffic can be monitored for a predetermined period of time. The predetermined period of time can be any defined time frame that indicates an amount of uplink traffic. For example, the wireless device 118 can monitor an amount of uplink traffic for a predetermined period of time (30 seconds, 1 minute, 2 minutes, etc.)

In 406, it determined whether to reselect a communication band. In embodiments, the reselect processes can be performed periodically, based on a change in conditions (wireless device movement, status of the wireless device, etc.) in the wireless device. If a communication band is not reselected, in 408 it can be determined whether a new priority is received. If a new priority is received, the process can return to 402. If a new priority is not received, the method 400 can return to 404.

If a communication band is reselected, in 410 it is determined whether the uplink traffic exceeds a predetermined threshold. In embodiment, the determined uplink traffic over the predetermined period of time can be compared to the predetermined threshold. For example, the wireless device 118 can compare the amount of uplink traffic determined in 404 and compare the amount to the predetermined threshold. The predetermined threshold can represent an amount of uplink traffic that warrants consideration in the reselection process.

If the uplink traffic exceeds the predetermined threshold, in 412, the reselection priority can be utilized in communication band reselection. For example, the wireless device 118 can utilize the reselection priority (e.g., Table 1, 2, or 3) provided by the component of the communication system 100 to perform the reselection process. If the uplink traffic does not exceed the predetermined threshold, in 414, a default priority can be utilized. For example, the wireless device 118 can utilize the default priority (e.g., Table 4).

In 416, other factors can be considered in communication band reselection. For example, after applying the reselection priority or default priority, the wireless device 118 can consider other factors in the reselection process of a communication band. The other factors can include radio link quality, communication band accessibility, etc.

For instance, in the example above illustrated in Table 2, the reselection priority can indicate that communication band 1 and communication band 2 have the same priority. To determine which of the communication band 1 and communication band 2 to reselect, the wireless device 118 can determine if both communication bands are available and select the communication band with a higher signal quality.

In 418, it is determined whether communication continue. If communication continues, the method 400 can return to 406. Otherwise, the method 400 can end or return to any point.

The methods, systems, devices, networks, access nodes, and equipment described above can be implemented with, contain, or be executed by one or more computer systems and/or processing nodes. The methods described above can also be stored on a non-transitory computer readable medium. Many of the elements described herein can be, comprise, or include computers systems and/or processing nodes. This includes, but is not limited to: the access node 104, the controller node 108, the gateway node 110, the wireless device 106, the relay node 106, the small relay nodes 114, 116 and 118 and/or the network 102.

Figure 5:
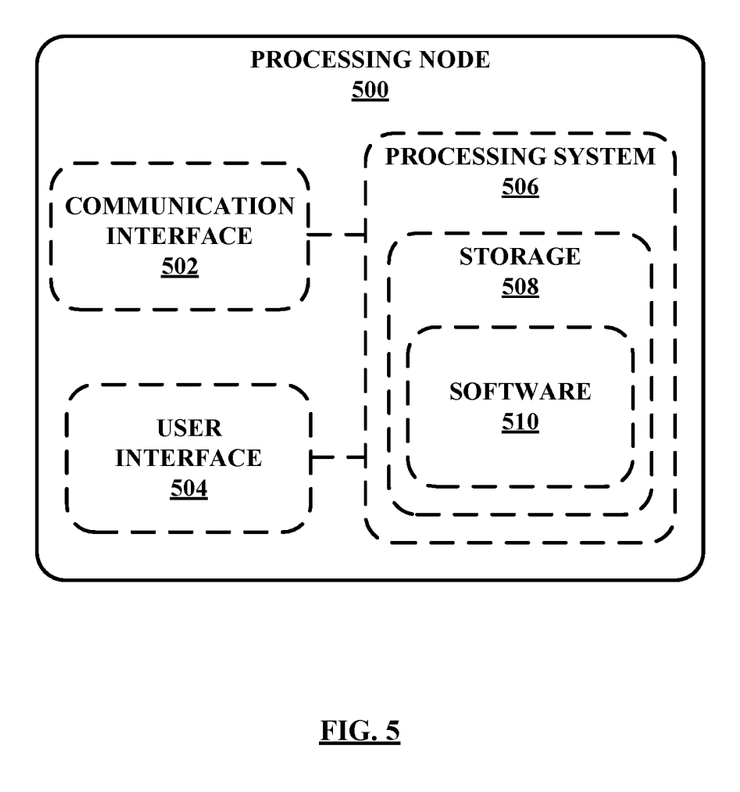
FIG. 5 depicts an example of a processing node for communication band reselection in a wireless network, according to embodiments of the present disclosure.

FIG. 5 depicts an example of a processing node 500. The processing node 500 includes a communication interface 502, a user interface 504, and, a processing system 506 in communication with the communication interface 502 and the user interface 504. The processing system 506 includes storage 508, which can comprise a disk drive, flash drive, memory circuitry, or other memory device. The storage 508 can store software 510, which is used in the operation of the processing node 500. The storage 508 can include a disk drive, flash drive, data storage circuitry, or some other memory apparatus. For example, the storage 508 can include a buffer. The software 510 can include computer programs, firmware, or some other form of machine-readable instructions, including an operating system, utilities, drivers, network interfaces, applications, or some other type of software. For example, in some embodiments, the software 510 can include instructions to implement the method 300, as described above. For example, in some embodiments, the software 510 can include instructions to implement 400, as described above.

The processing system 506 can include a microprocessor and other circuitry to retrieve and execute the software 510 from the storage 508. The processing node 606 can further include other components such as a power management unit, a control interface unit, etc., which are omitted for clarity. The communication interface 502 permits the processing node 500 to communicate with other network elements. The user interface 504 permits the configuration and control of the operation of the processing node 500.

The examples of systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium can include, for example, modulated signals transmitted through wired or wireless transmission paths.

While the teachings have been described with reference to examples of the embodiments thereof, those skilled in the art will be able to make various modifications to the described embodiments without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for improving service in a wireless network, the method comprising:
    determining a frame configuration and bandwidth for a plurality of communication bands available for communication with a wireless device;
    generating a reselection priority based on one or more of the frame configuration and bandwidth for each of the plurality of communication bands, wherein the reselection priority of each of the plurality of communication bands is based on a suitability of one or more of the frame configuration and bandwidth to service uplink traffic and wherein generating the reselection priority comprises:
        comparing the suitability of one or more of the frame configuration and bandwidth to service uplink traffic of the plurality of communication bands, and
        prioritizing each of the communication bands based on the comparison, wherein a communication band with a higher suitability to service uplink traffic is prioritized higher than a communication band with a lower suitability to service uplink traffic; and
    transmitting the reselection priority to the wireless device, wherein the wireless device utilizes the reselection priority in communication band reselection based on uplink traffic generated by the wireless device.

2. The method of claim 1, wherein the wireless device utilizes the reselection priority in communication band reselection in response to the uplink traffic over a predetermined period of time exceeding a predetermined threshold.

3. The method of claim 2, wherein the wireless device utilizes a default reselection priority in response to the uplink traffic generated by the wireless device over a predetermined time frame being below the predetermined threshold.

4. The method of claim 3, the method further comprising:
    generating the default reselection priority for the plurality of communication bands; and
    transmitting the default reselection priority to the wireless device.

5. The method of claim 1, wherein the plurality of communication bands comprise time-division duplex communication bands and frequency division duplex communication bands.

6. A system for improving service in a wireless network, the system comprising:
    a processing node; and
    a processor coupled to the processing node, the processor configuring the processing node to
        determine properties of a plurality of communication bands available for communication with a wireless device;
        compare, based on one or more of the properties, a suitability of each of the plurality of communication bands to service uplink traffic from the wireless device, wherein the properties comprise a frame configuration of the plurality of communication bands and a bandwidth of the plurality of communication bands, and wherein the comparison comprises:
            comparing the suitability of one or more of the frame configuration and bandwidth to service uplink traffic of the plurality of communication bands, wherein a communication band with a higher suitability to service uplink traffic is prioritized higher than a communication band with a lower suitability to service uplink traffic;

generate a reselection priority based on the comparison; and transmit the reselection priority to the wireless device, wherein the wireless device utilizes the reselection priority in communication band reselection based on uplink traffic generated by the wireless device.

7. The system of claim 6, wherein the plurality of communication bands comprise time-division duplex communication bands and frequency division duplex communication bands.

8. The system of claim 6, the processor further configuring the processing node to generate a default reselection priority for the plurality of communication bands; and transmit the default reselection priority to the wireless device.

9. The system of claim 8, wherein the default reselection priority is based on a reselection priority standard.

10. The system of claim 8, wherein the wireless device utilizes the reselection priority in communication band reselection in response to the uplink traffic over a predetermined period of time exceeding a predetermined threshold, and wherein the wireless device utilizes the default reselection priority in response to the uplink traffic generated by the wireless device over a predetermined time frame being below the predetermined threshold.

11. The system of claim 6, the processor further configuring the processing node to generate a new reselection priority based on one or more of a change in plurality of communication bands and a change in a priority associated with the wireless device.

12. A processing node for improving service in a wireless network, the processing node being configured to perform operations comprising:

receiving a reselection priority for a plurality of communication bands, wherein the reselection priority of each of the plurality of communication bands is based on a suitability of each of the plurality of communication bands to service uplink traffic, wherein the reselection priority of each of the plurality of communication bands is based on a suitability of one or more of a frame configuration and bandwidth of the plurality of communication bands to service uplink traffic and wherein the reselection priority prioritizes a communication band with a higher suitability to service uplink traffic higher than a communication band with a lower suitability to service uplink traffic;

determining uplink traffic over a predetermined period of time; and in response to the uplink traffic exceeding a predetermined threshold over the predetermined period of time, utilizing the reselection priority in communication band reselection.

13. The processing node of claim 12, the operations further comprising:

in response to the uplink traffic falling below the predetermined threshold over the predetermined period of time, utilizing a default reselection priority in communication band reselection.

14. The processing node of claim 12, the operations further comprising:

determining radio link quality for one or more of the plurality of communication bands, wherein the radio link quality is utilized in communication band reselection.

15. The processing node of claim 14, the operation further comprising:

determining an accessibility for one or more of the plurality of communication bands, wherein the accessibility is utilized in communication band reselection.

* * * * *